T. SIMONSEN.
MITER BOX.
APPLICATION FILED APR. 29, 1920.

1,373,105.

Patented Mar. 29, 1921.

Inventor.
Theodor Simonsen

Witnesses:
J. E. Jensen
Andrew Simonsen

T. SIMONSEN.
MITER BOX.
APPLICATION FILED APR. 29, 1920.

1,373,105.

Patented Mar. 29, 1921.
2 SHEETS—SHEET 2.

Witnesses:
J. E. Jensen.
Ole Andrew Simonsen

Inventor.
Theodor Simonsen

UNITED STATES PATENT OFFICE.

THEODOR SIMONSEN, OF JERSEY CITY, NEW JERSEY.

MITER-BOX.

1,373,105.  Specification of Letters Patent.  Patented Mar. 29, 1921.

Application filed April 29, 1920. Serial No. 377,704.

*To all whom it may concern:*

Be it known that I, THEODOR SIMONSEN, a citizen of the United States, residing at 287 Armstrong Ave., Jersey City, in the county of Hudson and State of New Jersey, have made an Invention in Miter-Boxes, of which the following is a specification.

This invention relates to an improvement in miter-boxes and its object is to present a miter-box which is capable of being set with one adjustment so that it presents different guides against which the work may rest to be cut or beveled at the four different angles necessary in fitting a molding or the like around any rhomboid (that is one with right angles or one with obtuse and acute angles).

Figure 1:
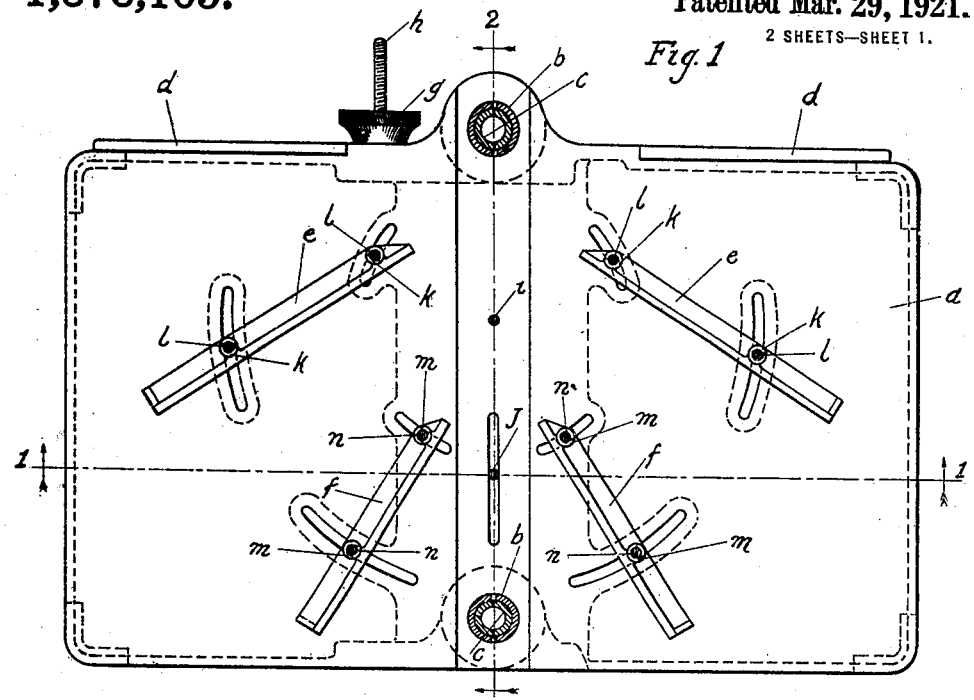
Figure 1 is a plan view of the top of the miter-box with the saw guide posts cut off above the table.

With reference more in detail to the drawing in which similar reference characters refer to like parts, $a$ is the frame or bed consisting of a table and suitable legs upon which is mounted the fixed slotted cylindrical members $b$ by means of a suitable fastening $b_1$, through a lug thereon. Within each of the members $b$ is a slotted vertically sliding saw guide $c$ through which a saw not shown may be guided while reciprocated.

Upon the rear edge of the frame $a$ are fixedly mounted guides $d$ which are at right angles to the plane of cut, and guide work to be cut at right angles to its length.

On the lower side of the frame $a$ is a plate Q fastened by screws $b_{11}$ having on its under side inturned lips $p$ and $t$ forming channels or grooves parallel to the plane of the saw wherein slides a plate O. To one end of this plate O is fastened a threaded member $h$ upon which is threaded an adjusting nut $g$ which serves to cause the member O to move endwise of the plate Q.

Upon the plate $p$ is also an upstanding pin J passing through a slot in plate Q for purposes hereinafter referred to.

Between the table $a$ and the plate Q are two segmental plates $s$ and $r$ mounted to swing between the underside of the top of the table $a$ and the plate Q and upon one another and pivoted to each other and to the table $a$ and plate Q by a pin $i$ disposed in the operating plane of the saw. Upon the upper face of the table $a$ there are disposed four rests or work guides $e, e, f, f$, which are fastened by pins $l$ and $n$ to the segmental slides $s$ and $r$ through arcuate slots struck from the pivot $i$ as shown in Fig. 1. One set of guides $e$ and $f$ is mounted upon each of the slides $r$ and $s$ and said guides $e$ and $f$ are disposed at right angles to each other, that is in Fig. 1 the right hand guide $e$ and left hand guide $f$ are at right angles to each other and both mounted upon slide $r$. The tops of the pins $l$ and $n$ are threaded and thereon are thumb nuts $k$ which may be tightened to hold the guides in adjusted position. When the segmental plates are assembled on the pivot $i$ they are so arranged to overlap each other that the work-guides $e$ of each plate are between the guides $e$ and $f$ of the outer plate.

Figure 2:
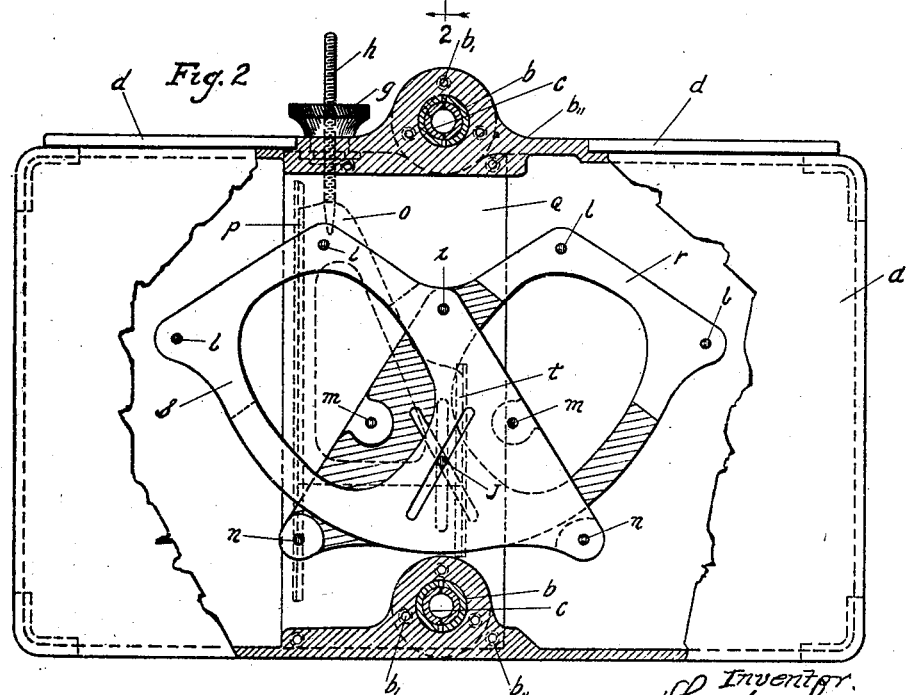
Fig. 2 is a view similar to Fig. 1 with part of the table broken away.

In the plates $r$ and $s$ are formed slots at an angle to the plane of the saw and at an angle to each other as shown in Fig. 2 and through these slots extends the above mentioned pin J which is mounted upon plate O and which when moved by the adjusting nut $g$ through the medium of plate O causes the adjustment of the guides $e$ and $f$. A slot is also formed on the top of the table parallel with the slot in plate Q to assist in guiding the pin J in its movement.

There are brackets $v$ which form stops for the sliding parts of the saw guides and are capable of vertical sliding in the fixed member $b$ and are held in adjusted position by means of the thumb screw $u$. These are for limiting the depth of the cut as is readily understood.

Figure 3:
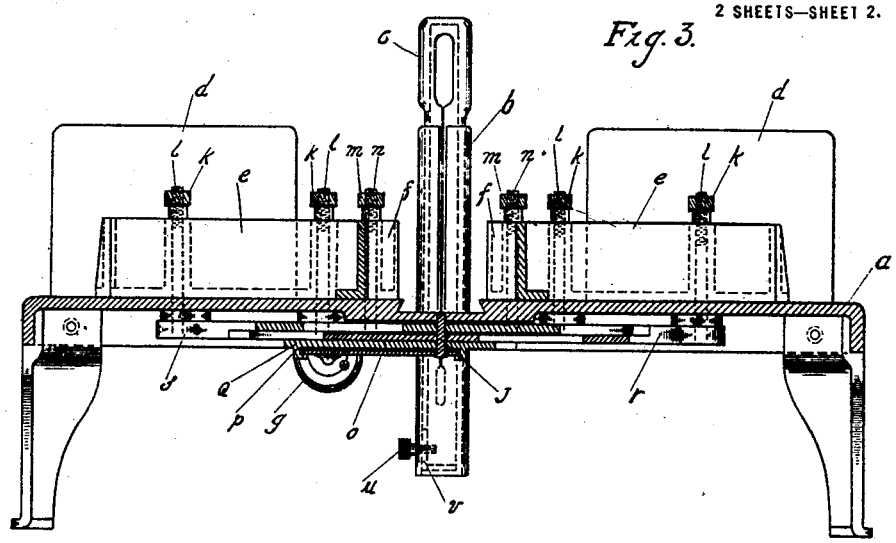
Fig. 3 is a longitudinal sectional elevation the section being taken on line 1—1 of Fig. 1.
Figure 4:
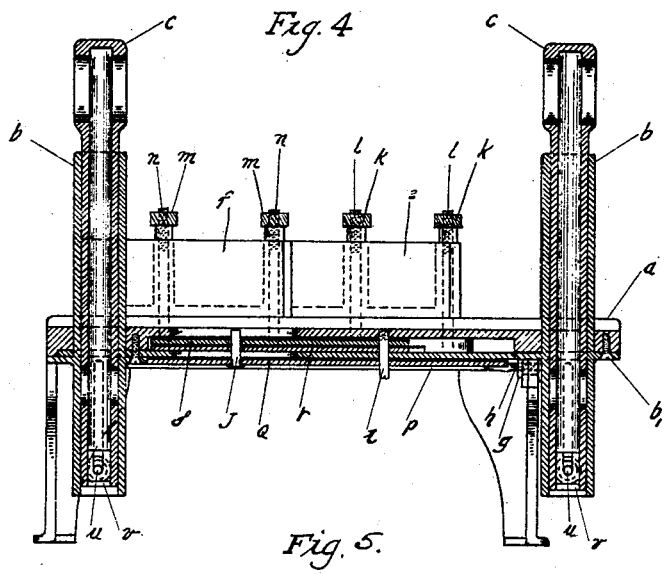
Fig. 4 is a transverse sectional elevation on line 2—2 of Fig. 1.

A central dovetailed groove is shown running across the top plate $a$ shown in Figs. 1 and 3, in which may be inserted a wood base piece to protect the saw teeth when the saw cuts through the work.

Figure 5:
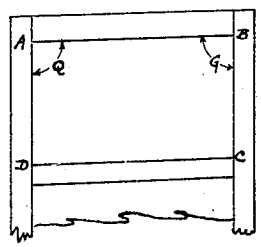
Fig. 5 is a diagrammatic view of a portion of a door or other structure upon which a molding may be mounted within the rhomboid A, B, C, D.

Operation: With reference to Fig. 5 if it is desired to fit a molding within the rhomboid A, B, C, D of a door or other such article, the angle G is measured then the thumb screws $k$ are loosened and the adjusting nut $g$ rotated thereby causing the guides $f\,f$ to move either farther apart or closer together as necessity demands until the guides $f\,f$ form the angle corresponding to the angle G and since the guides $f\,f$ or $e\,e$ move correspondingly and simultaneously they are always at the same angle with the plane of the saw and hence a piece of work presented to either guide will be cut at an angle half of the size of angle G and the cut guided by the corresponding guide will make the other half of the angle necessary for the bevel joint on the corner G. As the guides $e\,e$ are at right angles to $f\,f$ they when used as guides for the saw cut will cause angles to be formed complementary to the angles formed by the guides $f$ and the saw, and will be set exactly for angle Q with relation to each other and hence a cut guided by either guide $e$ will be exactly half of the angle Q as desired.

I claim—

A miter box comprising a base carrying alined saw guides and two members each comprising a pair of work rests, or guides at right angles to each other said members pivoted to each other and to the base by a common pivot located on the saw line one work rest of each member playing between the work rests of the other member and means for simultaneously and oppositely shifting said members whereby the angle between one work rest of one member and the corresponding work rests of the other member varies the angles between the other work rests of said members inversely.

THEODOR SIMONSEN.

Witnesses:
J. E. JENSEN,
OLE ANDREW SIMONSEN.